(12) United States Patent
Gan et al.

(10) Patent No.: US 10,239,660 B2
(45) Date of Patent: Mar. 26, 2019

(54) THREE-DIMENSIONAL STRUCTURE FOR STORING AND DISPLAYING AN ITEM

(71) Applicant: Comicave Studios Pte Ltd, Singapore (SG)

(72) Inventors: Yeung-Ee Gan, Singapore (SG); ZhongYong Guo, Singapore (SG); Zheng Ning Goh, Singapore (SG); Ka-Wei Wong, Singapore (SG)

(73) Assignee: Comicave Studios Pte Ltd, Singapore (SG)

( * ) Notice: Subject to any disclaimer, the term of this patent is extended or adjusted under 35 U.S.C. 154(b) by 49 days.

(21) Appl. No.: 15/251,986

(22) Filed: Aug. 30, 2016

(65) Prior Publication Data

US 2018/0057206 A1 Mar. 1, 2018

(51) Int. Cl.

| | |
|---|---|
| *B65D 21/032* | (2006.01) |
| *B65D 21/02* | (2006.01) |
| *A47F 3/14* | (2006.01) |
| *A47B 87/00* | (2006.01) |
| *A47B 87/02* | (2006.01) |
| *B65D 6/06* | (2006.01) |
| *F16B 5/07* | (2006.01) |
| *F16B 17/00* | (2006.01) |
| *F16B 1/00* | (2006.01) |

(52) U.S. Cl.
CPC ........ *B65D 21/0204* (2013.01); *A47B 87/008* (2013.01); *A47B 87/0292* (2013.01); *A47F 3/145* (2013.01); *B65D 11/12* (2013.01); *F16B 5/07* (2013.01); *F16B 17/00* (2013.01); *B65D 2313/04* (2013.01); *F16B 2001/0035* (2013.01)

(58) Field of Classification Search
CPC ............ B65D 21/0204; B65D 21/0233; B65D 21/0237; B65D 25/54; A47F 3/145; A47F 3/005; F16B 2001/0035; F16B 1/00
USPC ........ 220/23.86, 23.4, 23.83, 662, 602, 665; 206/436, 514, 770, 774, 745, 771, 776, 206/769, 756; 446/73, 75
See application file for complete search history.

(56) References Cited

U.S. PATENT DOCUMENTS

| | | | |
|---|---|---|---|
| 3,131,829 A * | 5/1964 | Masser | B65D 21/0204 206/144 |
| 5,542,562 A * | 8/1996 | Oratz | A47G 19/22 206/438 |

* cited by examiner

*Primary Examiner* — Stephen Castellano
(74) *Attorney, Agent, or Firm* — Polsinelli

(57) ABSTRACT

Three-dimensional structure is provided that includes an internal structure and an external structure configured to receive the internal structure. The internal structure includes a plurality of walls forming an accommodation opening and a magnetic element configured to be affixed or located within on the plurality of walls. The external structure includes a set of two surfaces having a first configuration of protrusions where the two of two surfaces are adjoining. Another set of two surfaces have a second configuration of protrusions, where the surfaces form at least one opening configured to allow insertion and removal of the internal structure. The set of two surfaces and the another set of two surfaces are configured for mating engagement with another external structure having substantially the same configurations, where the first configuration and the second configuration are configured to couple to each other.

24 Claims, 21 Drawing Sheets

THREE-DIMENSIONAL STRUCTURE FOR STORING AND DISPLAYING AN ITEM

FIELD

The present disclosure generally relates to a three-dimensional structure that includes an internal structure and an external structure, and the external structure is configured to receive the internal structure and couple at least to another external structure.

BACKGROUND

Display cases have long been used to store and present items within. Display cases include at least one portion that is transparent, so the items can be seen. The items are often covered or encapsulated within the display cases to protect the items from tarnish. The items can sit on a base inside the display cases.

BRIEF DESCRIPTION OF THE DRAWINGS

So that the manner in which the above recited features of the present disclosure can be understood in detail, a more particular description of the disclosure, may be had by reference to examples, some of which are illustrated in the appended drawings. It is to be noted, however, that the appended drawings illustrate only typical examples of this disclosure, and are therefore not to be considered limiting of its scope, for the disclosure may admit to other equally effective examples.

DETAILED DESCRIPTION

Figure 1:
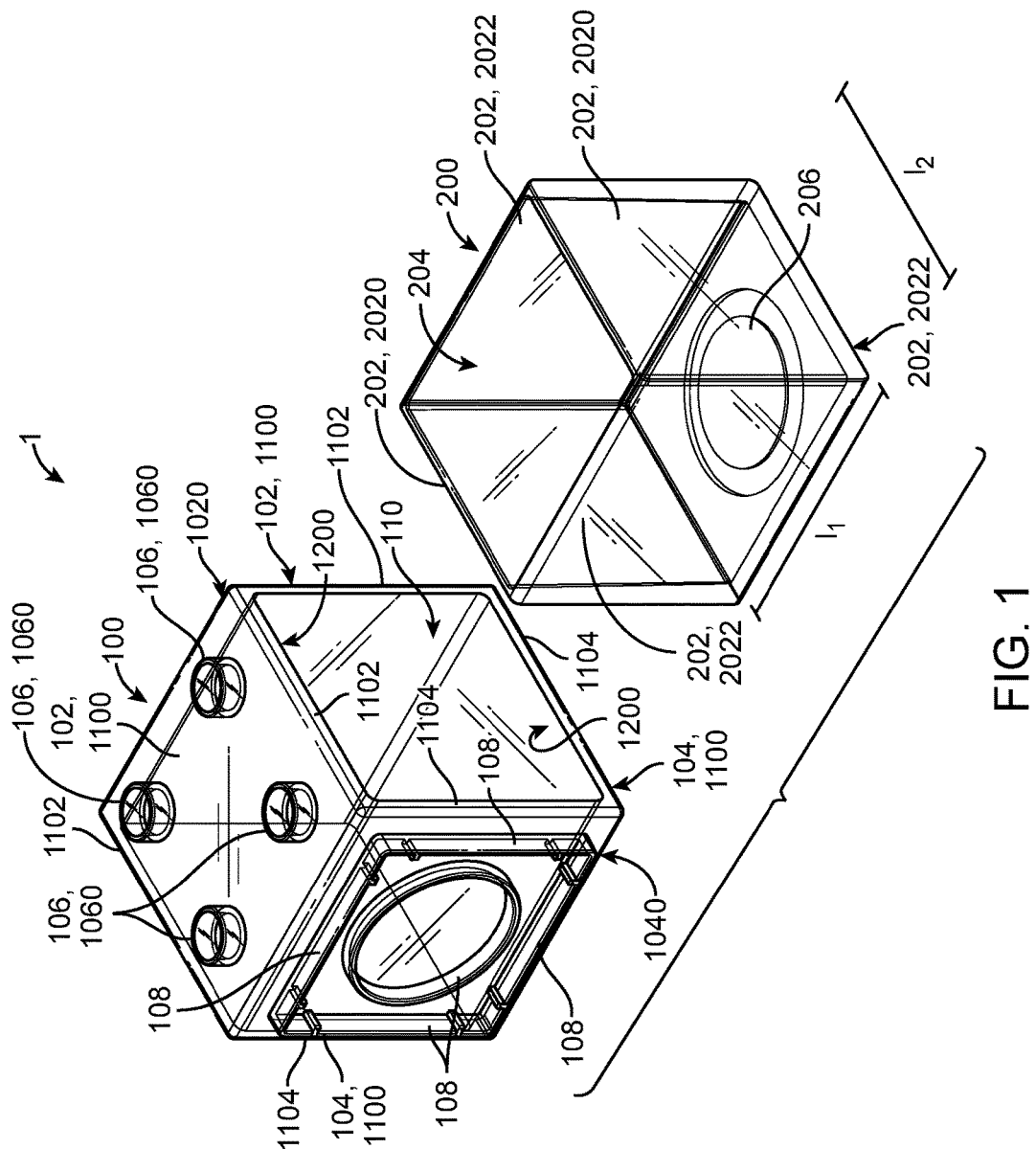
FIG. 1 is an exploded, perspective view of a three-dimensional structure according to an example of the present disclosure.

Various examples of the disclosure are discussed in detail below. While specific implementations are discussed, it should be understood that this is done for illustration purposes only. A person skilled in the relevant art will understand that other components and configurations can be used without parting from the spirit and scope of the disclosure.

Although illustrative implementations of one or more examples are illustrated below, the disclosed device can be implemented using any number of techniques. The disclosure should in no way be limited to the illustrative examples, drawings, and techniques illustrated herein, but can be modified within the scope of the appended claims along with their full scope of equivalents.

Unless otherwise specified, any use of any form of the terms "connect," "engage," "couple," "attach," or any other term describing an interaction between elements is not meant to limit the interaction to direct interaction between the elements and can also include indirect interaction between the elements described. In the following discussion and in the claims, the terms "including" and "comprising" are used in an open-ended fashion, and thus should be interpreted to mean "including, but not limited to." The term "transparent" means able to be seen through or not opaque. The term "substantially" means being largely but not necessarily wholly, for example, substantially transparent means that the material can be seen through but does not necessarily have to be clear. Additionally, substantially is an inclusive term that covers something that is true to form. For example, substantially cylindrical includes both cylindrical items and those items that are nearly or largely cylindrical.

A three-dimensional structure includes an external structure and an internal structure. The external structure is configured to receive the internal structure. The internal structure has five walls that form an accommodation opening which can receive and store items such as toys. In one example, the three-dimensional structure can be a display case or a storage container. The internal structure also includes a magnetic element which is configured to be attracted to a magnetic element within the toy. Accordingly, the magnetic element in the internal structure helps secure the toy. In at least one example, the toy can be suspended due to the connection between the magnetic elements in the toy and in the internal structure.

The external structure can also connect with one or more other external structures such that multiple three-dimensional structures can be securely connected and/or stacked. Each external structure has a set of two surfaces that includes a first configuration of protrusions and another set of two surfaces that includes a second configuration of protrusions. The first configuration of protrusions includes four protrusions which can be substantially cylindrical protrusions. The second configuration of protrusions can include four tabs with a hollow cylinder within the four tabs. Each of the four tabs has two protuberances. Each protrusion of the first configuration of protrusions is configured to be received and clamped between two protuberances and the hollow cylinder of the second configuration of protrusions. Specifically, the cylindrical protrusion is clamped between one protuberance from one tab and one protuberance from an adjacent tab. Two or more than two external structures can be connected to one another in multiple configurations as desired.

An example of a three-dimensional structure 1 is shown in FIG. 1. The three-dimensional structure 1 includes an external structure 100 and an internal structure 200. The external structure 100 is configured to receive the internal structure 200. The external structure 100 includes at least four sides 1100 that form at least one internal opening 110. In the present example shown in the figures, the external structure 100 has four sides 1100 that form two internal openings 110. Two of the sides 1100 correspond to a set of two surfaces 102 having a first configuration 106 of protrusions 1060; two of the sides 1100 correspond to another set of two surfaces 104 having a second configuration 108 of protrusions 1080, 1084. The set of two surfaces 102 and the another set of two surfaces 104 form at least one opening 110 which is configured to allow insertion and removal of the internal structure 200. In at least one example, the set of two surfaces 102 and the another set of two surfaces 104 form two openings 110 opposite to each other and configured to allow insertion and removal of the internal structure 200. As illustrated, the external structure 100 and the internal structure 200 are substantially cuboids. In other examples the internal structure 200 can be substantially a rectangular cuboid and the external structure 100 can be substantially a cube if the protrusions 1060, 1080, 1084 are excluded.

Both the external structure 100 and the internal structure 200 are substantially transparent such that items inside the three-dimensional structure are visible from the outside. In other examples, only the internal structure 200 is substantially transparent. In yet other examples, only portions of the external structure 100 and/or the internal structure 200 can be substantially transparent. In the illustrated example, the external structure 100 and the internal structure 200 are made of a polymer, for example polycarbonate. In other examples, the external structure 100 and the internal structure 200 can be made of a combination of polycarbonate and acrylonitrile butadiene styrene, poly(methyl methacrylate), or glass. The external structure 100 and the internal structure can be made of the same material. In other examples, the external structure 100 and the internal structure can be made of different materials. In yet other examples, different materials can form different portions of the external structure 100 and the internal structure 200.

Figure 2:
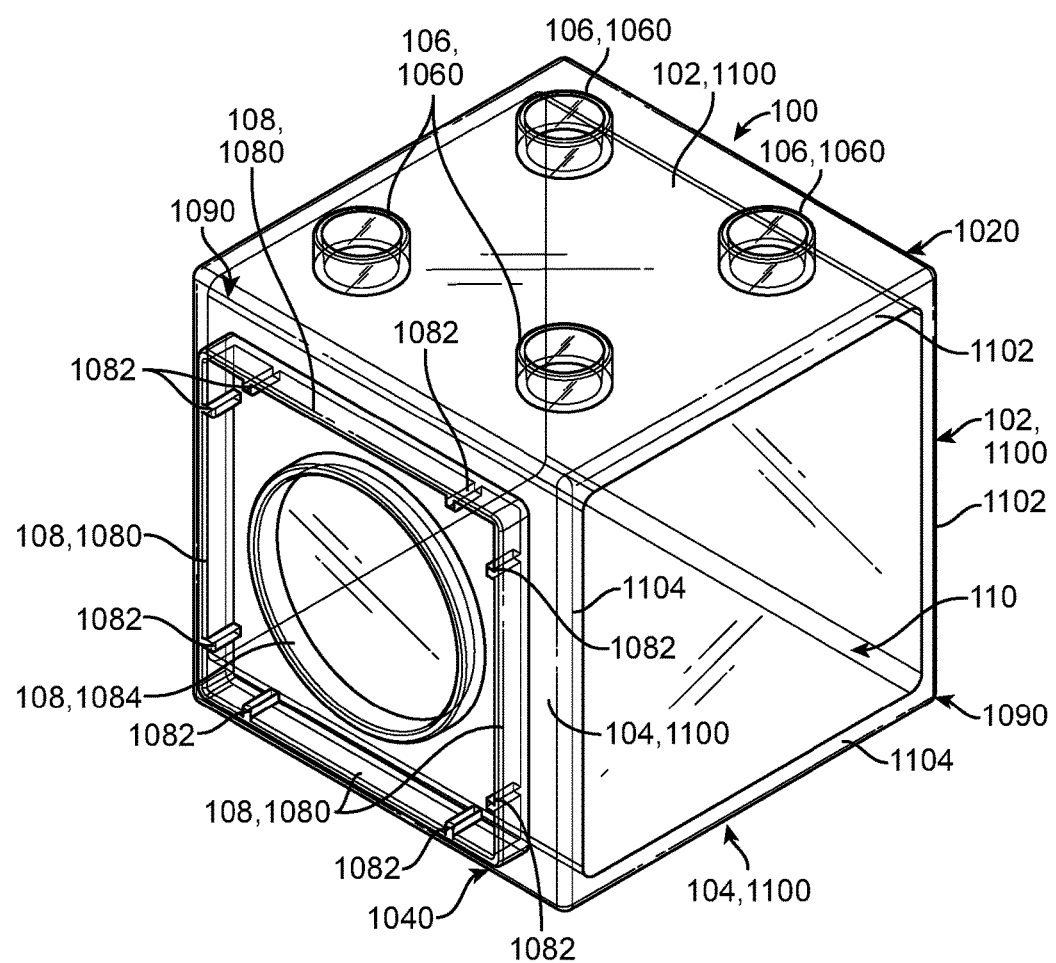
FIG. 2 is a perspective view of an external structure of FIG. 1.
Figure 3:
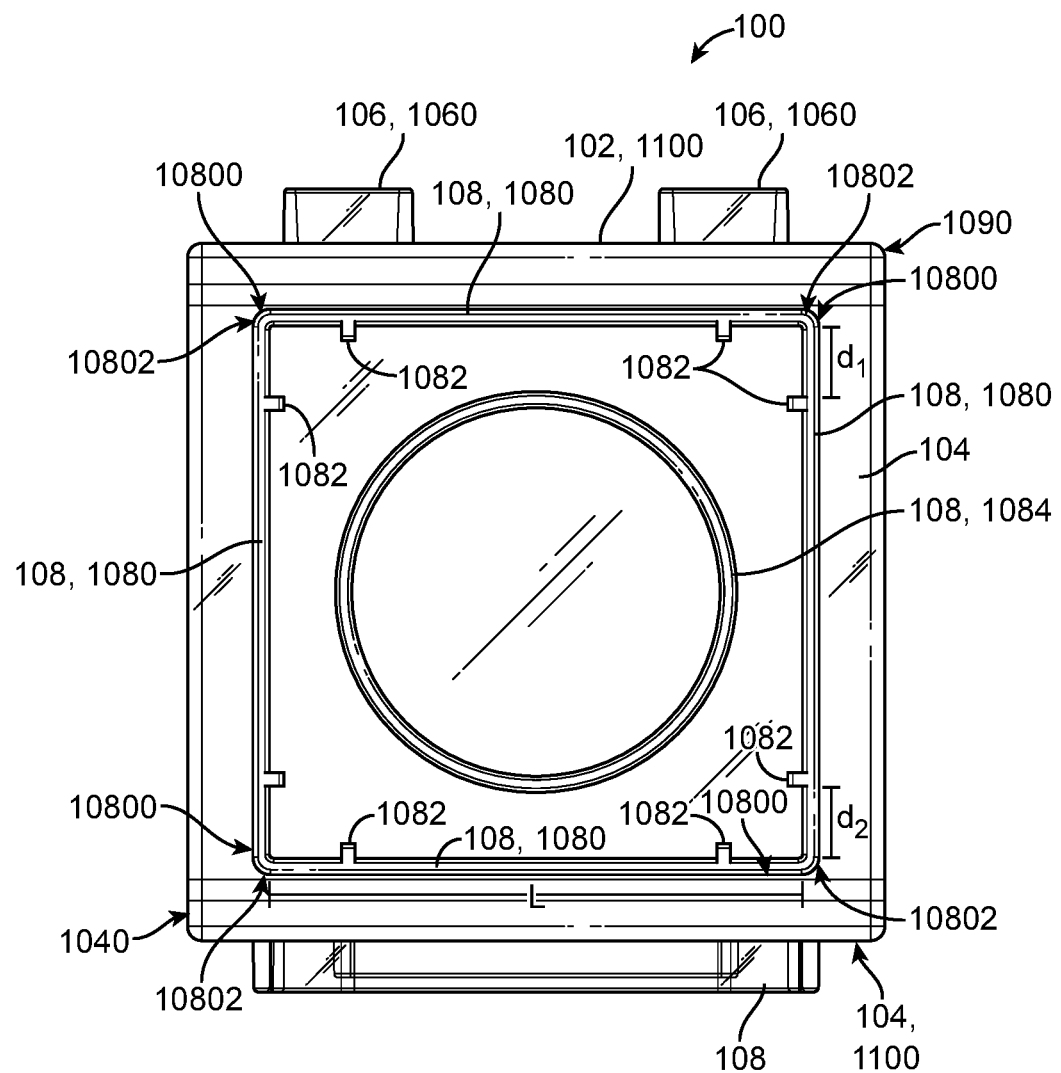
FIG. 3 is a front elevational view of FIG. 2.
Figure 4:
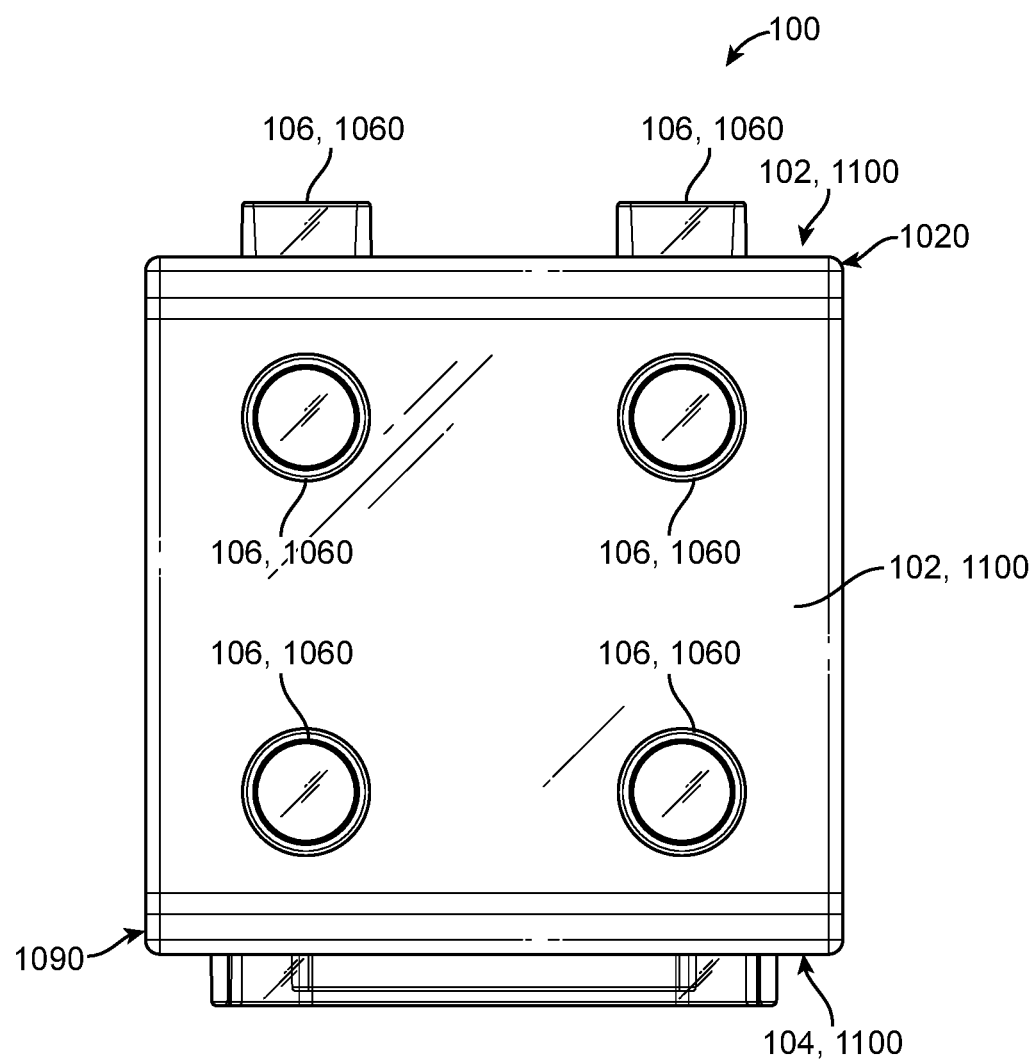
FIG. 4 is a rear elevational view of FIG. 2.
Figure 5:
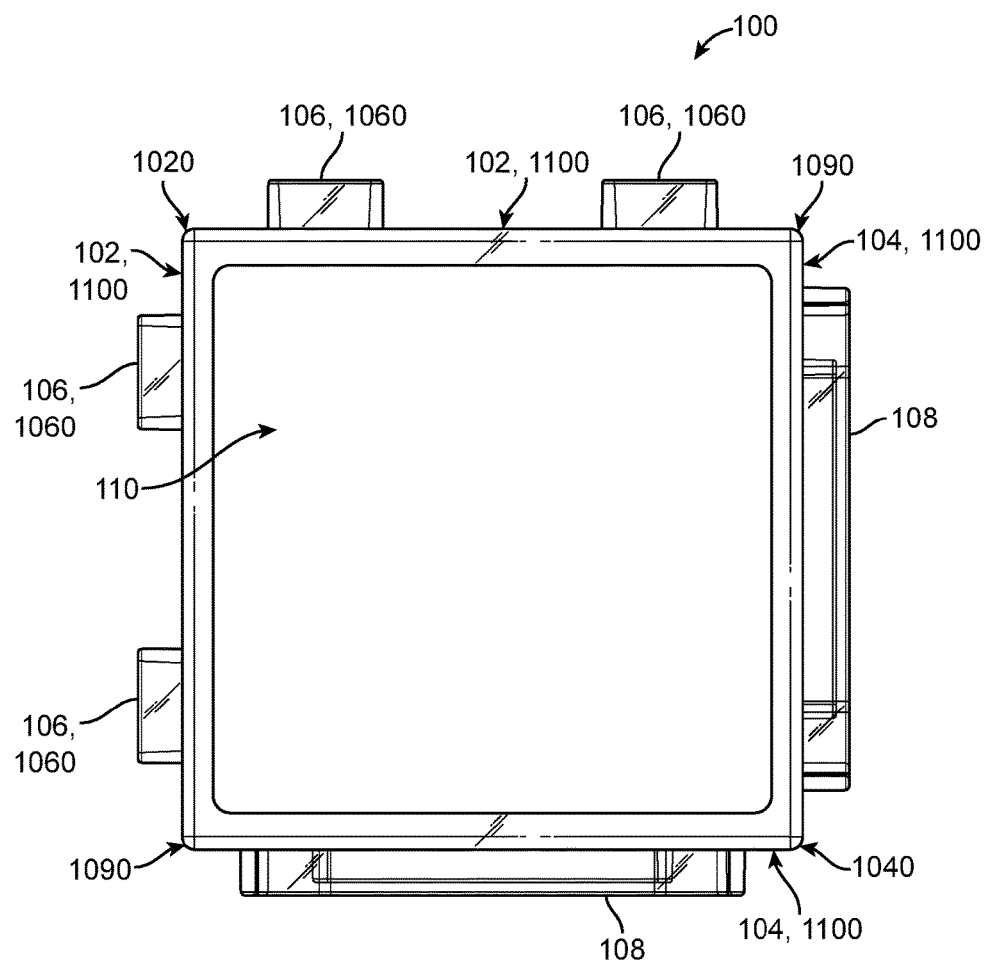
FIG. 5 is a right elevational view of FIG. 2.
Figure 6:
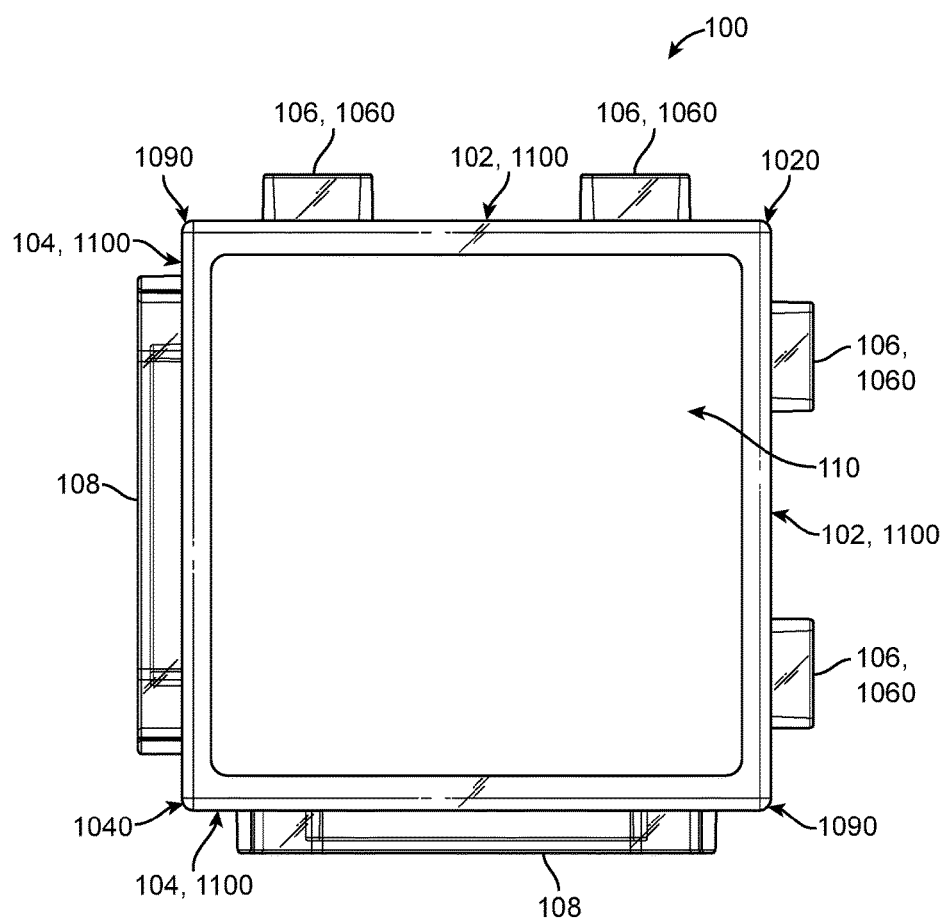
FIG. 6 is a left elevational view of FIG. 2.
Figure 7:
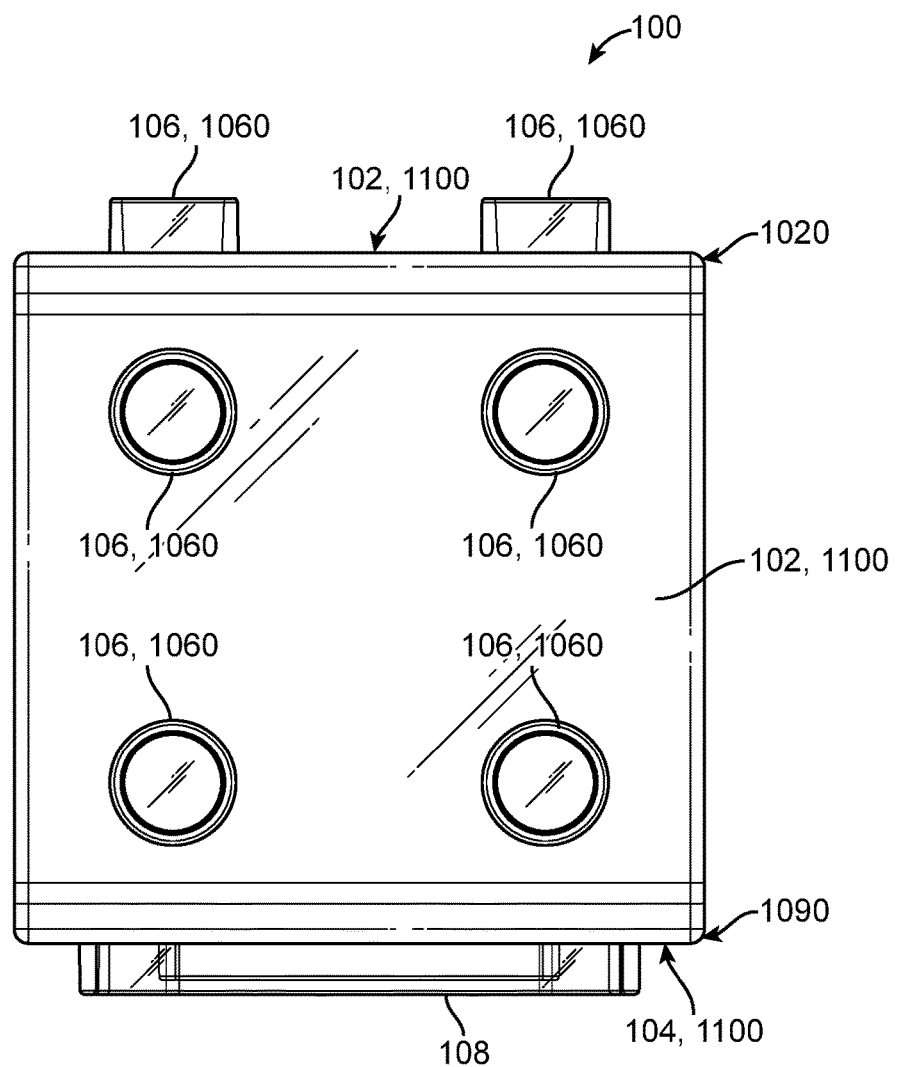
FIG. 7 is a top view of FIG. 2.
Figure 8:
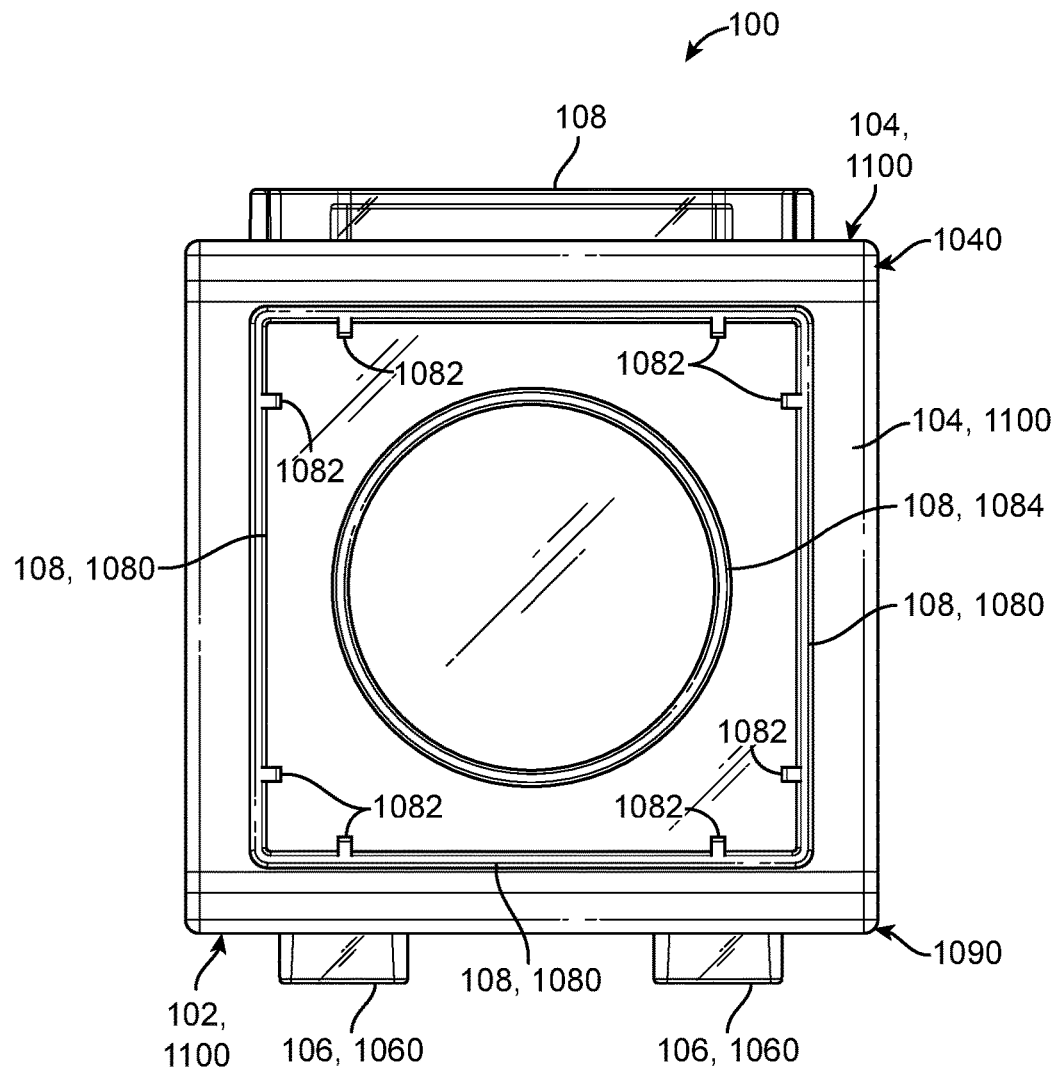
FIG. 8 is a bottom view of FIG. 2.

FIGS. 2-8 show each of the sides of the external structure 100. FIG. 2 shows an isometric view of the external structure 100 while FIGS. 3 and 8 are elevational views of the set of two surfaces 104 with the second configuration 108 of protrusions 1080, 1084. FIGS. 4 and 7 show the set of two surfaces 102 with the first configuration 106 of protrusions 1060. FIGS. 3 and 4 show opposing sides of the external structure 100; FIGS. 7 and 8 show opposing sides. FIGS. 5 and 6 show the opposing sides having the openings 110 which allow insertion and removal of the internal structure 200.

As shown in FIG. 2, the first configuration 106 of protrusions 1060 includes four substantially cylindrical protrusions 1060. In other examples, the first configuration 106 of protrusions 1060 can include two, three, or more than four protrusions 1060. While the illustrated protrusions 1060 are cylindrical, the protrusions 1060 can be any suitable shape such as cuboids. The four cylindrical protrusions 1060 can be hollow cylindrical protrusions. In other examples, the protrusions 1060 can be solid or partially hollow cylindrical protrusions.

The second configuration 108 of protrusions 1080, 1084 is also shown in FIGS. 3 and 8 and includes four tabs 1080 and a hollow cylinder 1084 within the four tabs 1080. The four tabs 1080 are substantially the same length L and are adjoined at their respective ends 10800, 10802. For example, one end 10800 of a first tab 1080 is connected to an end 10802 of a second tab 1080, and the other end 10800 of the second tab 1080 is connected to an end 10802 of a third tab 1080.

Each of the four tabs 1080 includes two protuberances 1082. A first protuberance 1082 is located a predetermined distance d1 from one end 10800 of a respective tab 1080 while a second protuberance 1082 is located a predetermined distance d2 from another end 10802 opposite the one end 10800 of the respective tab 1080. Each of the protuberances 1082 extend inward toward the hollow cylinder 1084. The protuberances 1082 can be extensions of the tabs 1080, or in other examples, the protuberances 1082 are separate pieces that are adjoined to the tabs 1080.

While the tabs 1080 in the illustrated example are adjoined at their ends 10800, 10802, in other examples, the tabs 1080 are not adjoined and are separate. For example, the ends 10800, 10802 of the tabs 1080 can be substantially at the protuberances 10802. The tabs 1080 connect the two protuberances 1082, forming a three sided protrusion. In yet other examples, there are no tabs 1080, and the second configuration 108 of protrusions includes the hollow cylinder 1084 and the protuberances 1082.

FIGS. 4 and 7 illustrate elevational views of the surfaces 102 which include the first configuration 106 of protrusions 1060. The two sets of surfaces 102 with the first configuration 106 of protrusions 1060 are adjoining and are substantially similar. Each of the two surfaces 102 having the first configuration 106 of protrusions 1060 are joined at a first joint 1020 which is also shown in FIGS. 5 and 6. The two surfaces 102 are one continuous piece that is curved or bent at the first joint 1020. In other examples, the two surfaces 102 are separate pieces that are joined together at the first joint 1020. Each of the two surfaces 104 having the second configuration 108 of protrusions 1080, 1084 are joined at a second joint 1040. The two surfaces 104 are one continuous piece that is curved or bent at the second joint 1040. In other examples, the two surfaces 104 are separate pieces that are joined together at the second joint 1040. Two mating joints 1090 are formed where respective portions of the two surfaces 102 having the first configuration 106 of protrusions 1060 adjoin the two surfaces 104 having the second configuration 108 of protrusions 1080, 1084. In at least one example, three of the sides 1100 of the external structure 100 are formed as one continuous piece that is curved or bent such that there are three sides 1100 of substantially equal size. Two of the sides 1100 are parallel to one another on opposing ends of the third side 1100 and substantially perpendicular to the third side 1100. A fourth side 1100 is connected to the ends of the two parallel sides 1100 to complete the four sides 1100 of the external structure 100. The four sides 1100 of the external structure 100 form the two openings 110 opposite to each other which are configured to allow insertion and removal of the internal structure 200.

Figure 9:
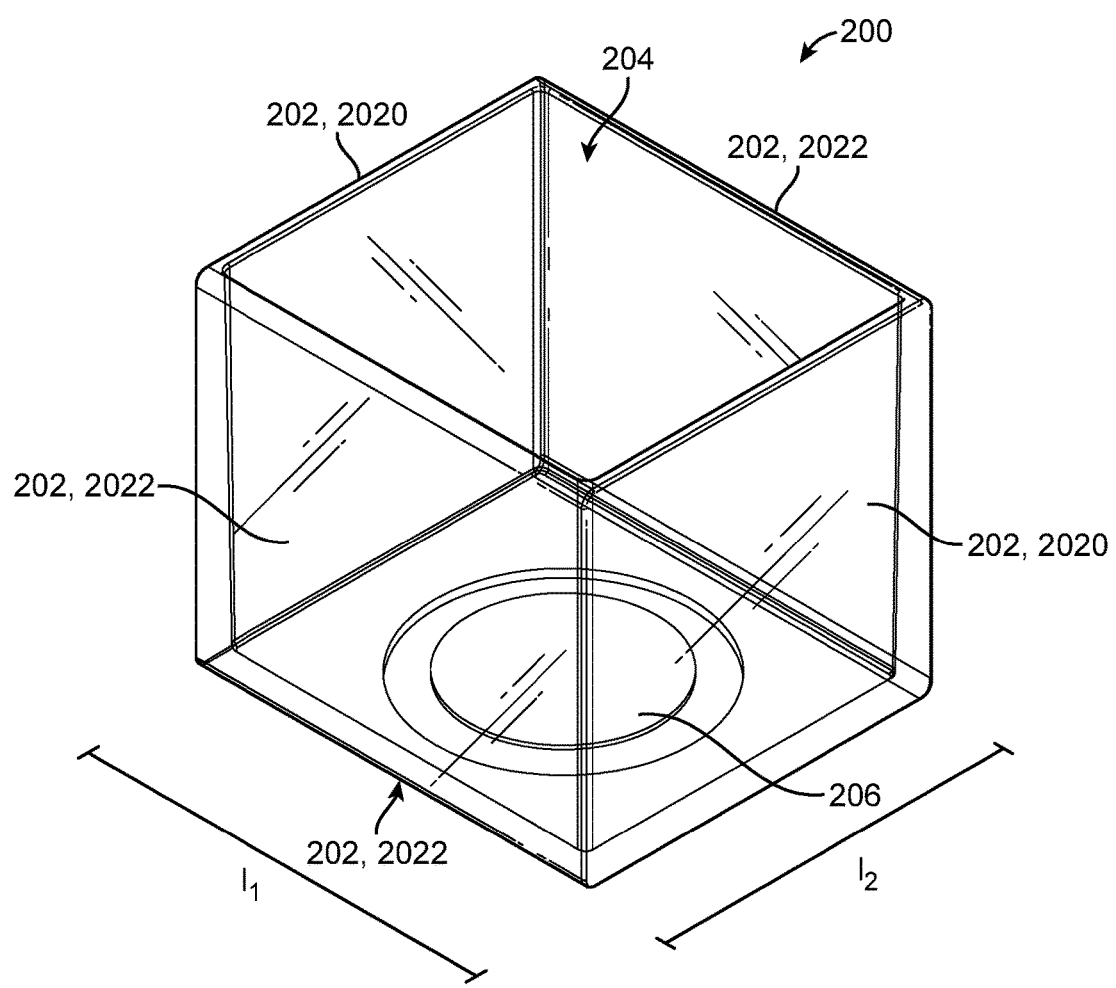
FIG. 9 is a perspective view of an internal structure of FIG. 1.
Figure 10:
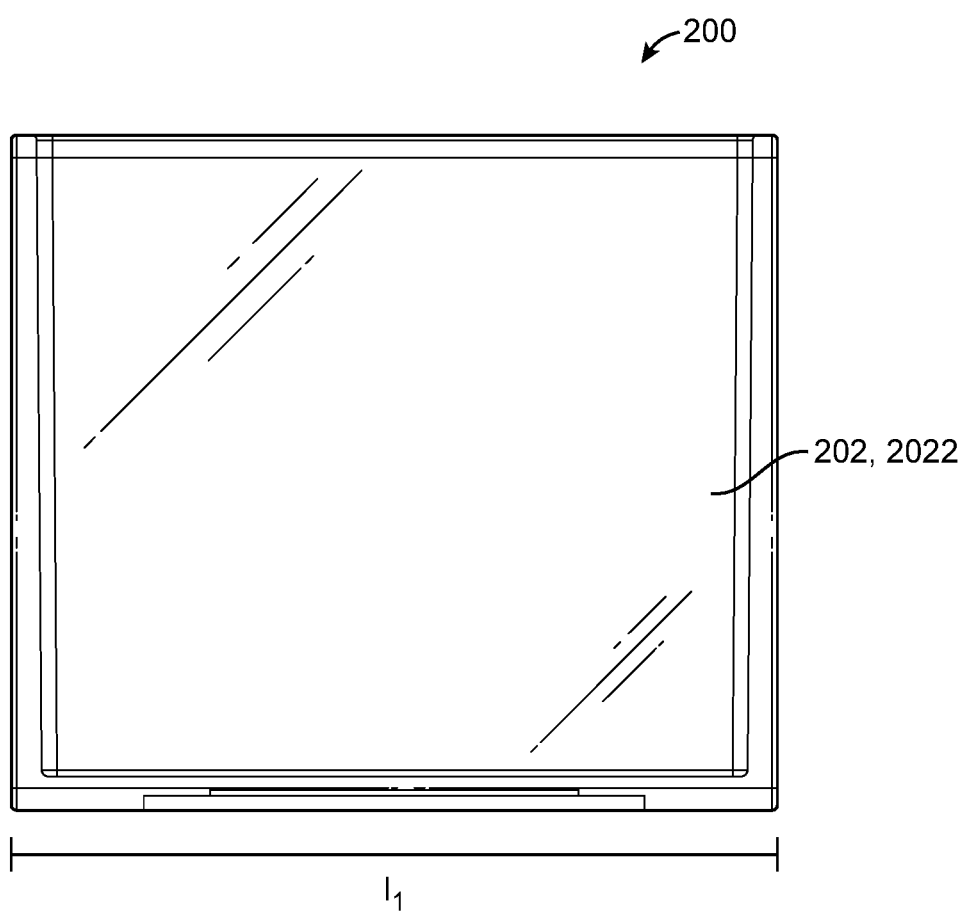
FIG. 10 is a front elevational view of FIG. 9.
Figure 11:
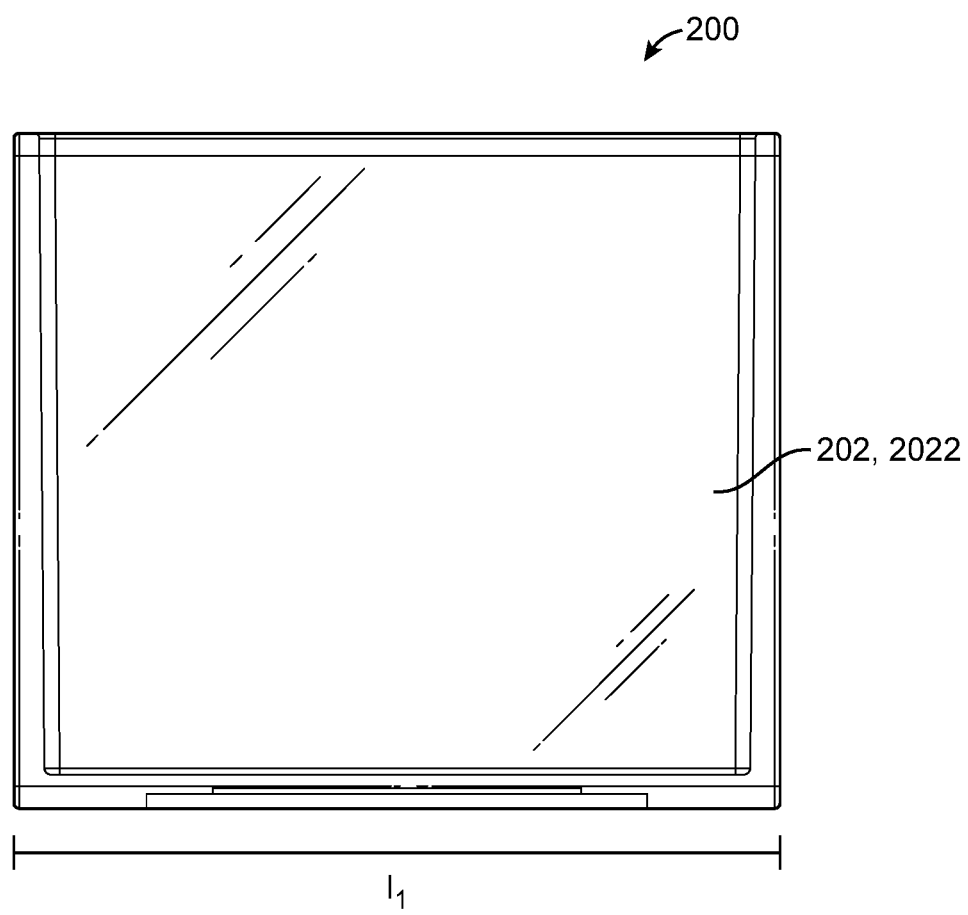
FIG. 11 is a rear elevational view of FIG. 9.
Figure 12:
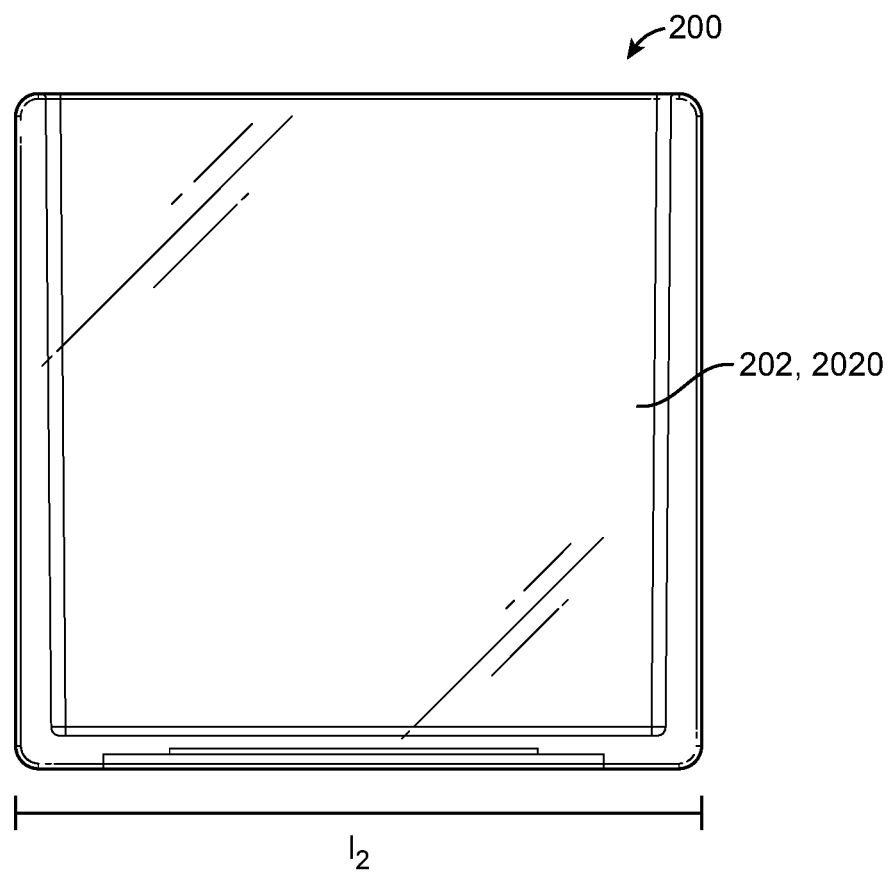
FIG. 12 is a right elevational view of FIG. 9.
Figure 13:
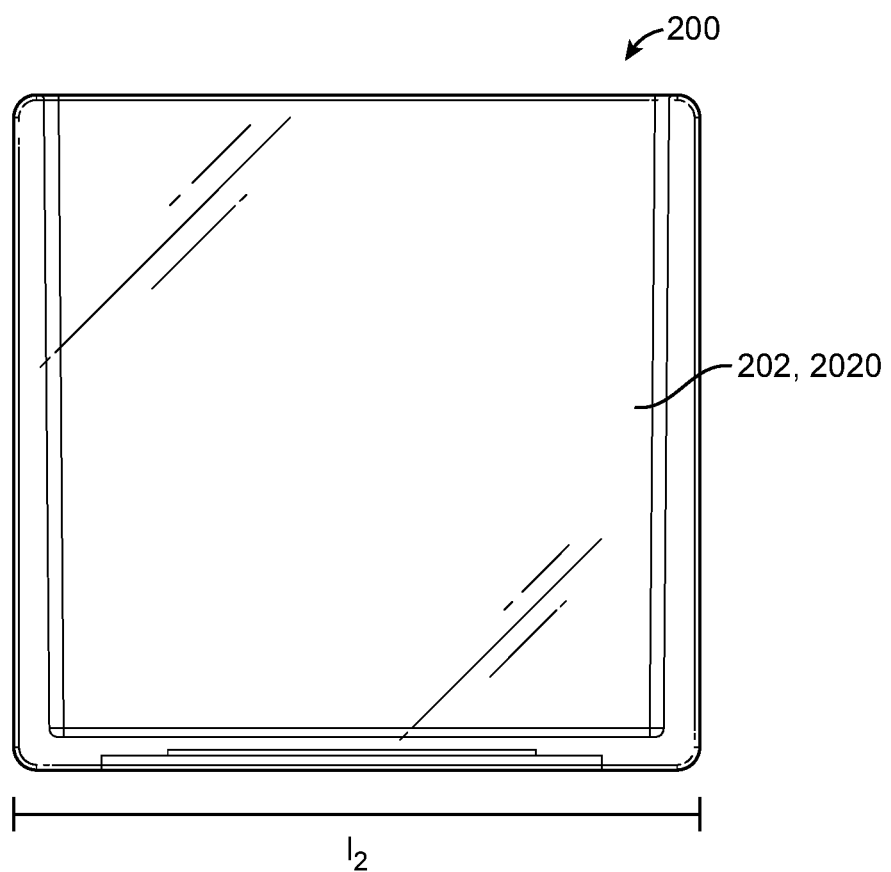
FIG. 13 is a left elevational view of FIG. 9.
Figure 14:
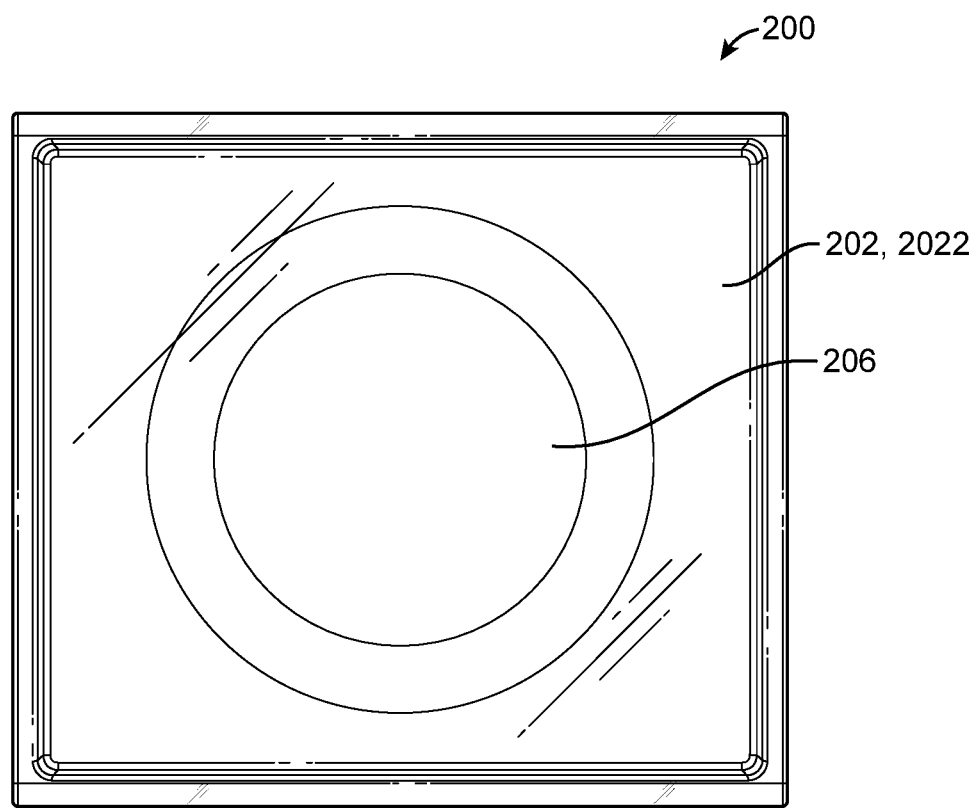
FIG. 14 is a top view of FIG. 9.
Figure 15:
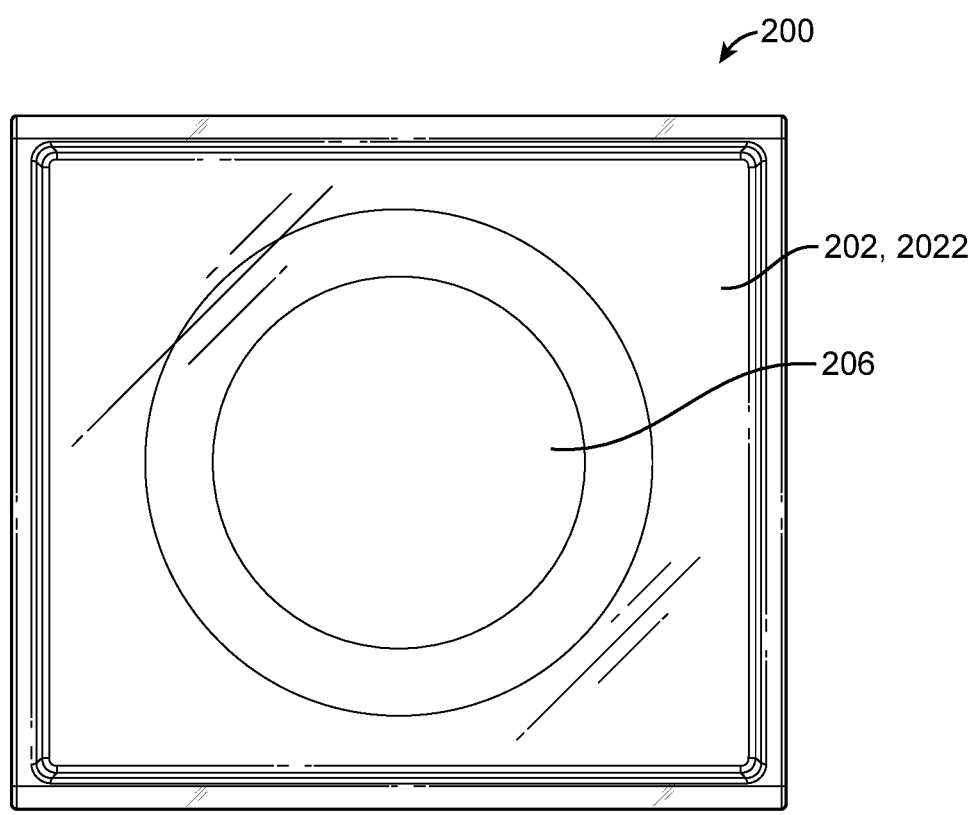
FIG. 15 is a bottom view of FIG. 9.

FIGS. 9-15 show different views of the interior structure 200. As shown in FIG. 9, the interior structure 200 includes a plurality of walls 202 that form an accommodation opening 204. The interior structure 200 can have five walls 202 so that the accommodation opening 204 is formed where a sixth wall would normally be in a rectangular cuboid. The plurality of walls 202 can all be formed from one continuous piece. In other examples, the plurality of walls 202 can be separate pieces. A magnetic element 206 is configured to be affixed or located within one or the plurality of walls 202. The magnetic element 206 can be removable or non-removable. In at least one example, the magnetic element 206 can be affixed within one of the plurality of walls 202 by an adhesive. The magnetic element 206 can produce a magnetic field or can be attracted to a magnetic field. The magnetic element 206 can be or include a ferromagnetic component, for example iron. In other examples, the magnetic element 206 can be a permanent magnet. The magnetic element 206 is cylindrical, but can be any suitable shape.

Figure 16:
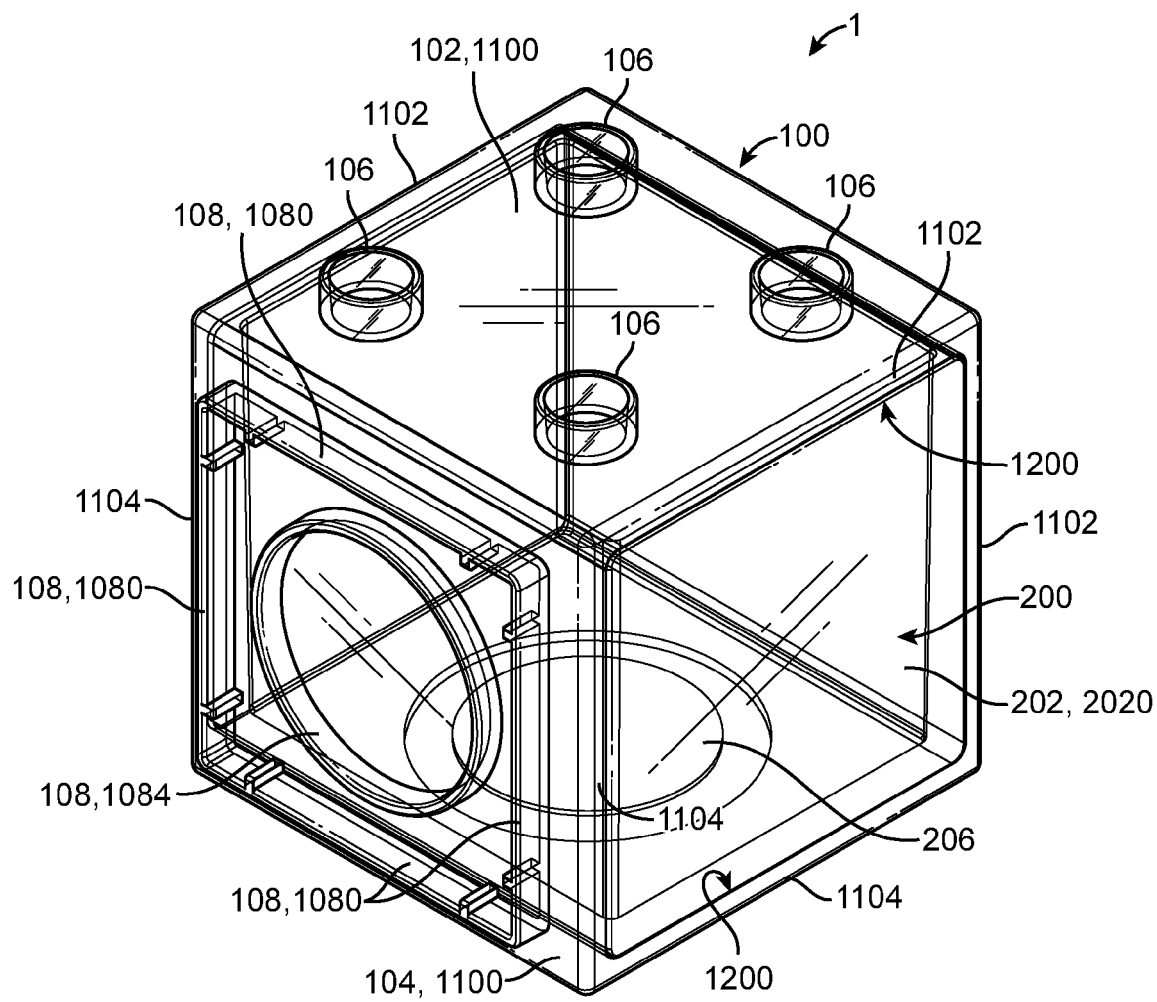
FIG. 16 is a perspective view of a three-dimensional structure according to an example of the present disclosure.

Three 2022 of the five walls 202 (also shown in FIGS. 10 and 11) have a length 11 while the other two walls 2020 (also shown in FIGS. 12 and 13) have a length 12. The length 12 of the two walls 2020 is shorter than the length 11 of the other three walls 2022. The length 12 is substantially the same length of the external structure 100. When the internal structure 200 is located inside of the external structure 100, as shown in FIG. 16, the two walls 2020 are substantially flush with ends 1102, 1104 of the four sides 1100 and the accommodation opening 204 is not accessible. Accordingly, when the internal structure 200 is located inside the external structure 100, a cuboid structure is formed, excluding the protrusions 1060, 1080, 1084.

Figure 17:
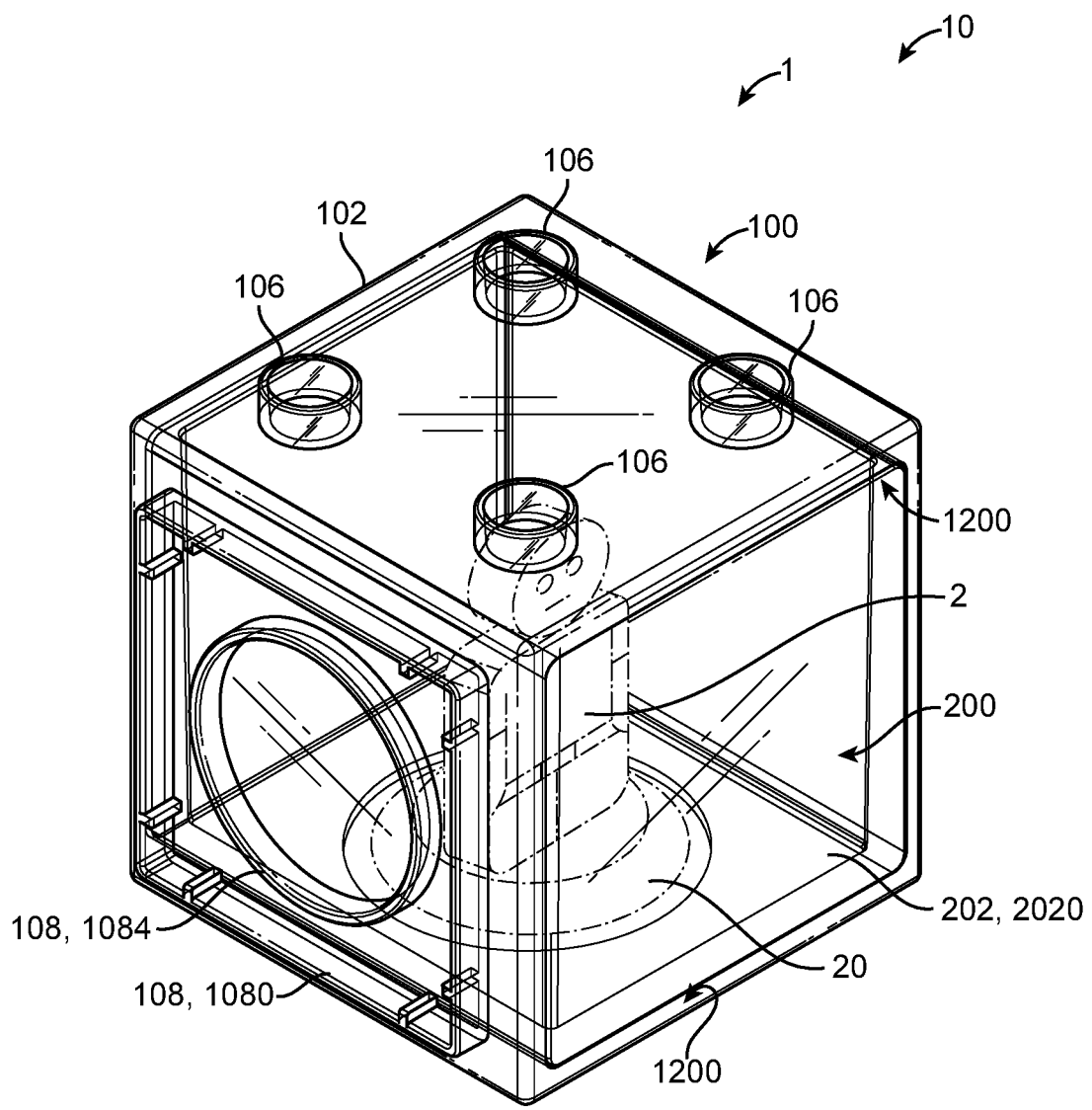
FIG. 17 is a perspective view of a three-dimensional structure with a toy in a configuration according to an example of the present disclosure.
Figure 18:
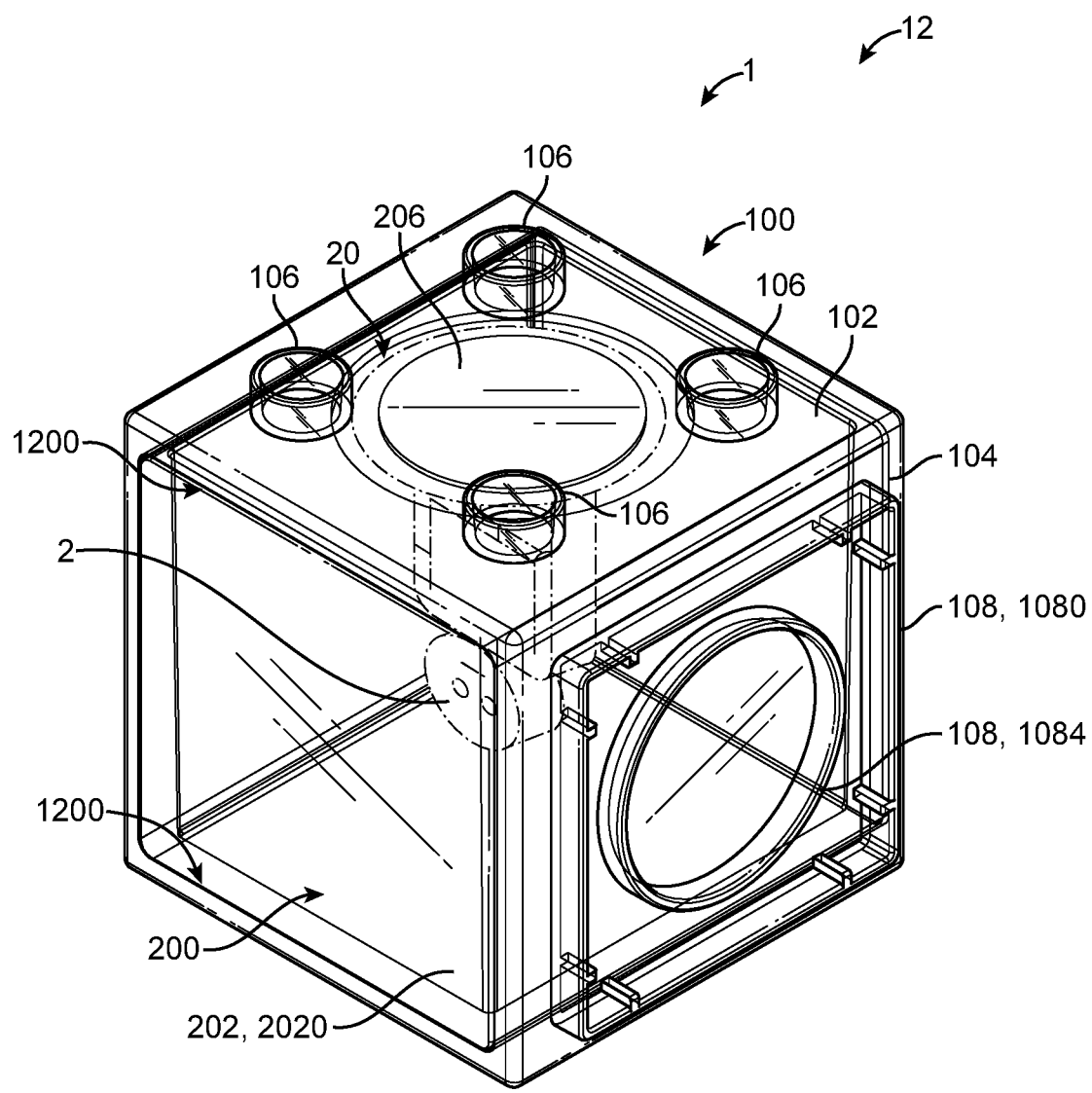
FIG. 18 is a perspective view of a three-dimensional structure with a toy in another configuration according to an example of the present disclosure.

As shown in FIGS. 17 and 18, a toy 2 is sized to fit through the accommodation opening 204 and be contained in the interior structure 200. In other examples, one or more items, such as stapler removers or paper clips, can be contained in the interior structure 200 where the three-dimensional structure 1 functions as a storage container. The toy 2 includes a magnetic element 20 that is configured to be attracted to the magnetic element 206 of the internal structure 200. The magnetic element 20 is a permanent magnet, and in other examples, the magnetic element 20 of the toy 2 can be or include a ferromagnetic component, for example iron. Similar to the magnetic element 206 of the internal structure 200, the magnetic element 20 of the toy 2 can be substantially cylindrical or any other suitable shape. The magnetic elements 20, 206 help keep the toy 2 in place. When the internal structure 200 is located inside of the external structure 100, the toy 2 is not accessible.

The internal structure 200 is configured to be inserted through one of the two opposing internal openings 110 in only two orientations or configurations 10, 12. The magnetic element 206 of the internal structure 200 is configured to be located adjacent to a wall 1200 that includes one of the first configuration 106 of protrusions 1060 or one of the second configuration 108 of protrusions 1080, 1084. When the internal structure 200 is inserted through the internal openings 110 in a first orientation 10, as shown in FIG. 17, the toy 2 sits on top of the magnetic element 206 of the internal structure 200. When the internal structure 200 is inserted through the internal openings 110 in a second orientation 12, as shown in FIG. 18, the toy 2 can be suspended because of the attraction between the magnetic element 20 of the toy 2 and the magnetic element 206 of the internal structure 200. In the second configuration 12, the toy 2 can also sit on the external structure 100 through the accommodation opening 204. While the entire three-dimensional structure 1 is substantially transparent, in other examples, at least the walls 2020 with a shorter length 12 are transparent. If the remainder of the three-dimensional structure 1 is opaque, the toy 2 can still be seen through the walls 2020.

Figure 19:
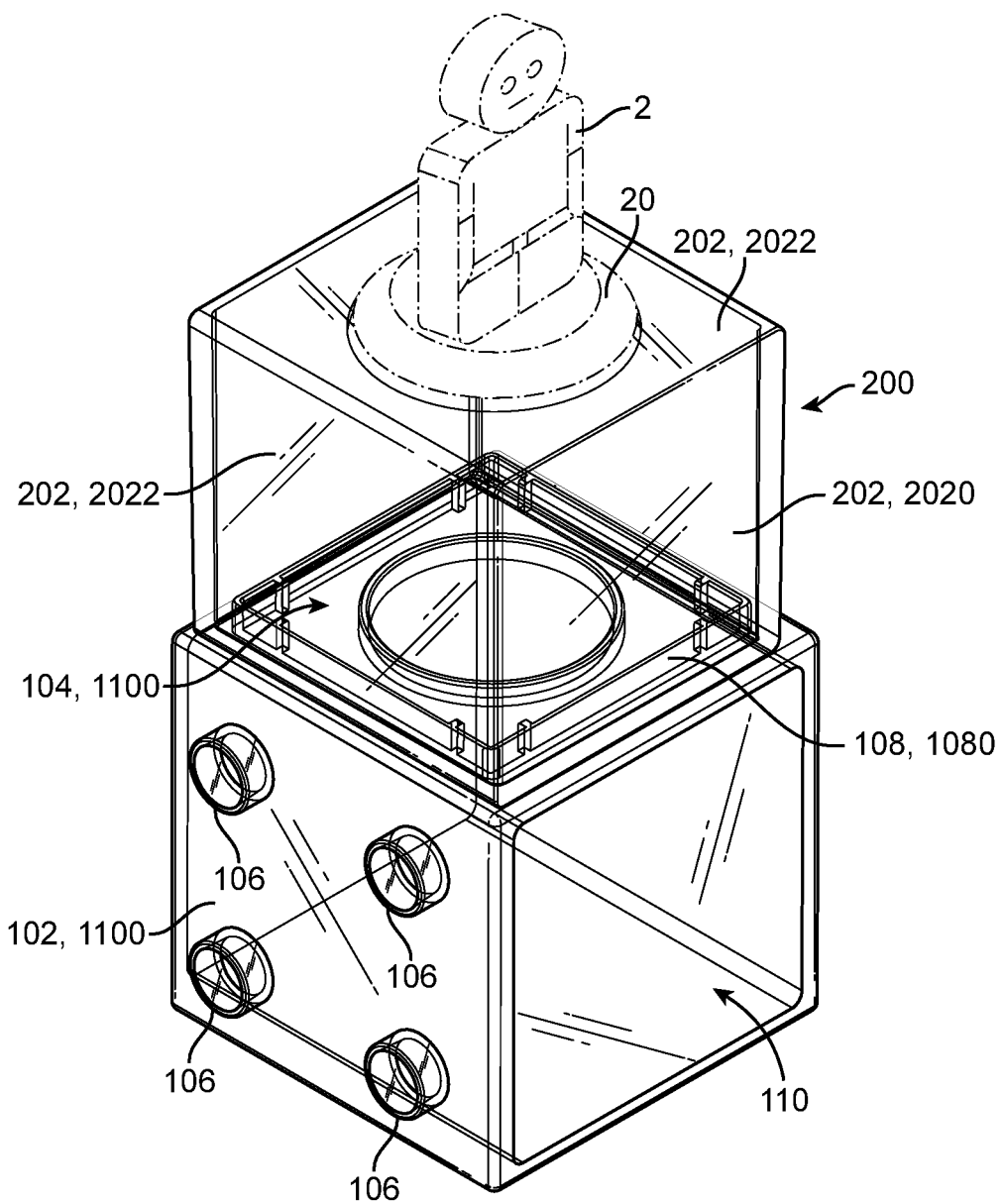
FIG. 19 is a perspective view of yet another configuration according to an example of the present disclosure.

Another configuration 14 of the three-dimensional structure 1 is shown in FIG. 19. The internal structure 200 is configured to be coupled to only one of the set of two surfaces 102 or the another set of two surfaces 104. The first configuration 106 of protrusions 1060 can be contained within the accommodation opening 204 of the internal structure 200 or the second configuration 108 of protrusions 1080, 1084 can be contained within the accommodation opening 204. If the internal structure 200 is coupled to one of the two surfaces 104 having the second configuration 108 of protrusions 1080, 1084, two opposing tabs 1080 abut the inside of two of the walls 202 of the internal structure 200. The two opposing tabs 1080 can abut the inside of the walls 2022 with the longer length 11. The toy 2 sits on top of the wall 202 of the internal structure 200 opposite the accommodation opening 204, such that the toy 2 is on the top of the three-dimensional structure 1. In other examples, the toy 2 can sit inside the internal structure 200 on top of the protrusions 1060, 1080, 1084 or be suspended because of the attraction with the magnetic element 206 of the internal structure 200. The toy 2 can also sit inside the external structure 100.

Figure 20:
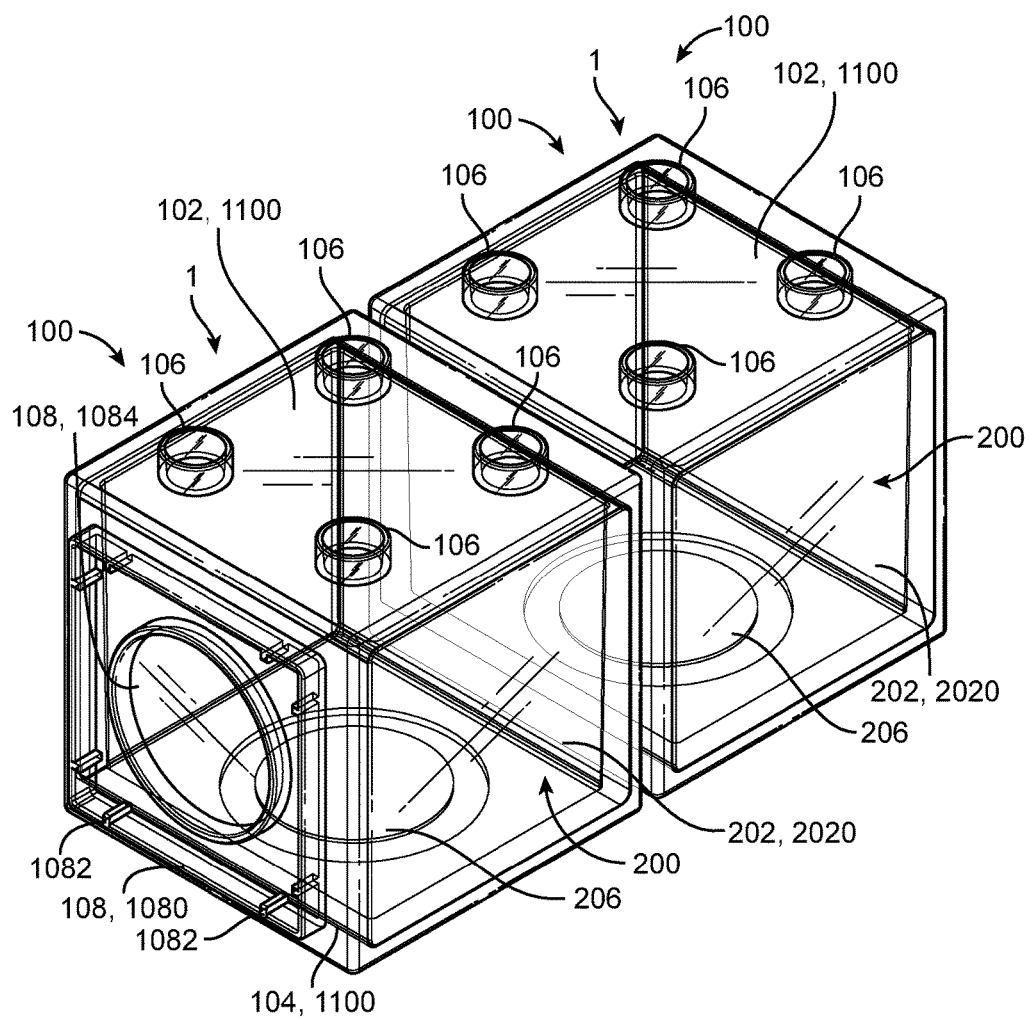
FIG. 20 is a perspective view of two three-dimensional structures coupled to one another according to an example of the present disclosure.
Figure 21:
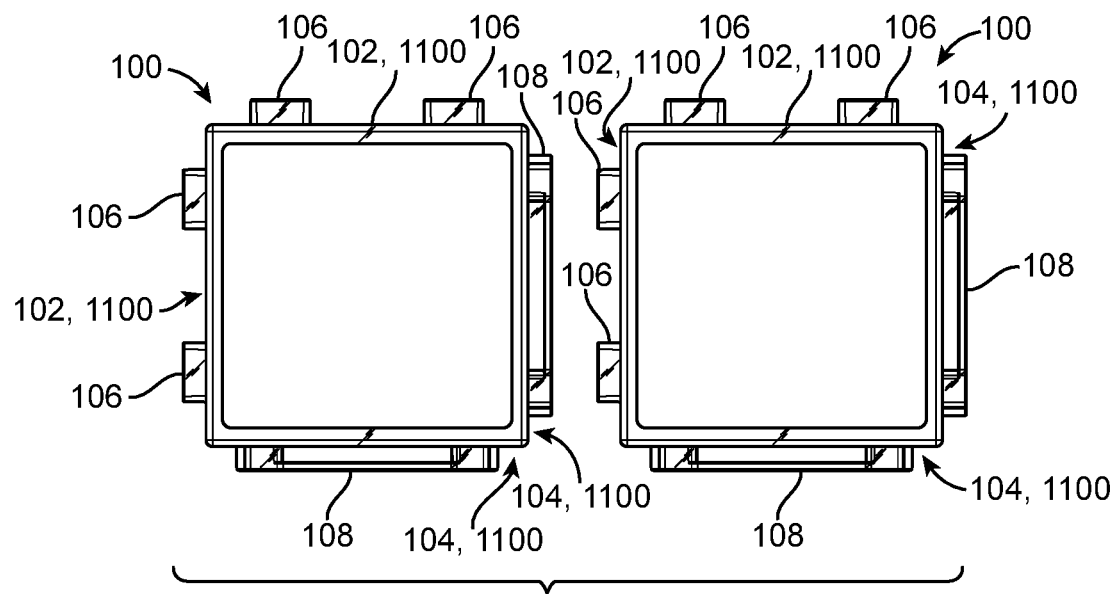
FIG. 21 is an elevational view of two three-dimensional structures according to an example of the present disclosure.
Figure 22:
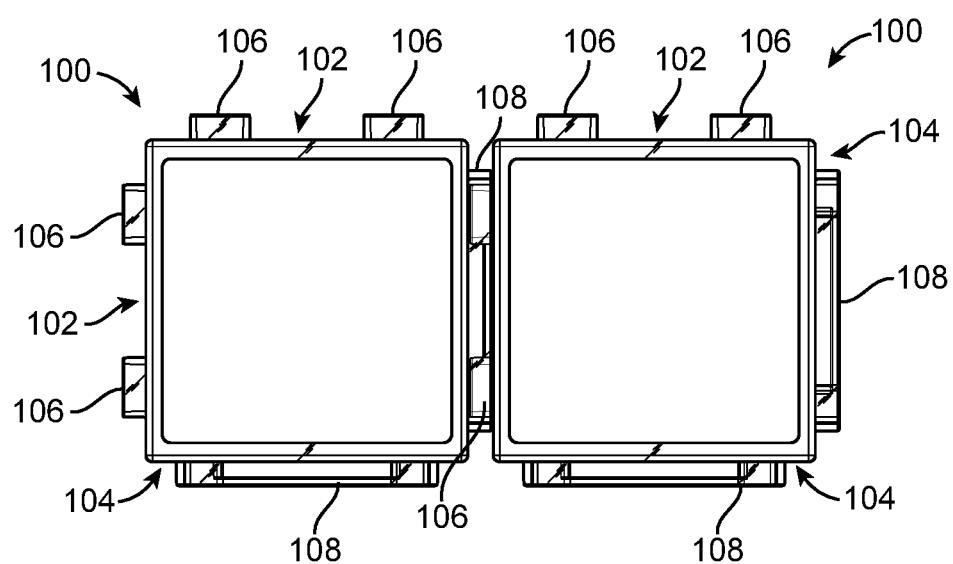
FIG. 22 is an elevational view of two three-dimensional structures coupled to one another according to an example of the present disclosure.

As shown in FIGS. 20-22, the external structures 100 are configured to couple with other external structures 100 to connect multiple three-dimensional structures 1 into a three-dimensional structure system. The external structures 100 can be connected on the same level or stacked on top of one another to form multiple levels of three-dimensional structures 1. As with a single three-dimensional structure 1, a plurality of toys 2 are each configured to be removably installed within the internal structures 200 and can be magnetically coupled to the magnetic elements 206. Also, the three-dimensional structures 1 can be in any configuration, for examples configurations 10, 12, 14. The three-dimensional structures 1 can each be in the same or different configurations.

The set of two surfaces 102 having the first configuration 106 of protrusions 1060 and the set of two surfaces 104 having the second configuration 108 of protrusions 1080, 1084 are configured for mating engagement with another external structure 100 having a set of two surfaces 102 and another set of two surfaces 104 that have substantially the same configurations 106, 108. The first configuration 106 and the second configuration 108 are configured to couple to each other. At least one of the protrusions 1060 is clamped between two protuberances 1082 of the tabs 1080 and the hollow cylinder 1084. One of the protuberances 1082 that abuts a protrusion 1060 is proximate to one end 10800 of one tab 1080 while the other protuberance 1082 that abuts the same protrusion 1060 is proximate to an end 10802 of an adjacent tab 1080. The four protrusions 1060 can be clamped in substantially similar ways. As such, each of the cylindrical protrusions 1060 are received and clamped between the two respective protuberances 1082 and the hollow cylinder 1084.

Multiple configurations, including more complex configurations, can be made when connecting and/or stacking three or more three-dimensional structures 1. The number of three-dimensional structures 1 that can be connected is not limited. For example, two three-dimensional structures can be connected side-by-side as a base while a third three-dimensional structure can span the top of the two base three-dimensional structures. Two protrusions 1060 of the first configuration 106 of protrusions 1060 are clamped within the protrusions 1080, 1084 of the second configuration 108 of protrusions 1080, 1084 of one three-dimensional structure, and the remaining two protrusions 1060 of the first configuration 106 of protrusions 1060 are clamped within the second configuration 108 of protrusions 1080, 1084 of the second three-dimensional structure. A fourth three-dimensional structure can then connect and stack on top of the third three-dimensional structure.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

The invention claimed is:

1. A transparent display case comprising:
   a transparent internal structure comprising:
      a plurality of walls forming an accommodation opening,
      a magnetic element configured to be affixed or located within one of the plurality of walls; and
   a transparent external structure configured to receive the transparent internal structure and comprising:
      a set of two surfaces having a first configuration of protrusions, wherein the set of two surfaces are adjoining;
      another set of two surfaces having a second configuration of protrusions, wherein the set of two surfaces and the another set of two surfaces form at least one opening configured to allow insertion and removal of the internal structure;
   wherein the set of two surfaces and the another set of two surfaces are configured for mating engagement with another external structure having a set of two surfaces and another set of two surfaces that have substantially the same configurations, where the first configuration and the second configuration are configured to couple to each other.

2. The transparent display case as recited in claim 1, further comprising a toy that is sized to fit through the accommodation opening.

3. The transparent display case as recited in claim 2, wherein the toy includes a magnetic element configured to be attracted to the magnetic element of the transparent internal structure.

4. The transparent display case recited in claim 3, wherein the magnetic element of the toy is a permanent magnet and the magnetic element of the transparent internal structure is a ferromagnetic component.

5. The transparent display case as recited in claim 3, wherein the magnetic element of the toy and the magnetic element of the transparent internal structure are cylindrical.

6. The transparent display case as recited in claim 1, wherein each of the two surfaces having the first configuration of protrusions are joined at a first joint and each of the two surfaces having the second configuration of protrusions are joined at a second joint.

7. The transparent display case as recited in claim 6, further comprising two mating joints formed where respective portions of the two surfaces having the first configuration of protrusions adjoin the two surfaces having the second configuration of protrusions.

8. The transparent display case as recited in claim 7, wherein the transparent external structure is substantially cuboids.

9. The transparent display case as recited in claim 7, wherein the transparent internal structure is substantially a rectangular prism and the external structure is substantially a cube, excluding the protrusions.

10. The transparent display case as recited in claim 9, wherein the first configuration of protrusions comprises four cylindrical protrusions.

11. The transparent display case as recited in claim 10, wherein the four cylindrical protrusions are hollow cylindrical protrusions.

12. The transparent display case as recited in claim 9, wherein the second configuration of protrusions comprises four tabs that are substantially the same length and adjoined at their respective ends and a hollow cylinder within the four tabs.

13. The transparent display case as recited in claim 12, wherein each of the four tabs comprises two protuberances, wherein a first protuberance is located a predetermined distance from one end of a respective tab and a second protuberance is located a predetermined distance from another end opposite the one end of the respective tab and each of the protuberances extend inward toward the hollow cylinder.

14. The transparent display case as recited in claim 12, wherein the magnetic element of the transparent internal structure is configured to be located adjacent to a wall that includes one of the first configuration of protrusions or one of the second configuration of protrusions.

15. The transparent display case as recited in claim 9, wherein the transparent internal structure has five walls so that an opening is formed where a sixth wall would normally be in a rectangular cuboid.

16. The transparent display case as recited in claim 15, wherein the transparent external structure comprises four sides that form two opposing internal openings and two of the five walls of the transparent internal structure have a length that is shorter than the other three walls, whereby when the transparent internal structure is located inside of the transparent external structure the two walls of the transparent internal structure are substantially flush with ends of the four sides so that when a toy is located within the transparent internal structure it is not accessible.

17. The transparent display case as recited in claim 16, wherein the transparent internal structure is configured to fit through one of the two opposing internal openings in only two orientations.

18. The transparent display case as recited in claim 9, wherein the set of two surfaces and the another set of two surfaces form two openings opposite to each other and configured to allow insertion and removal of the transparent internal structure.

19. The transparent display case as recited in claim 9, wherein the transparent internal structure is configured to be coupled to only one of the set of two surfaces or the another set of two surfaces.

20. The transparent display case as recited in claim 1, wherein when the transparent internal structure is located inside of the transparent external structure, one of the plurality of walls of the transparent internal structure is substantially flush with the set of two surfaces and the another set of two surfaces which form the at least one opening.

21. The transparent display case as recited in claim 20, wherein when the transparent internal structure is located inside of the transparent external structure, the accommodation opening is not accessible.

22. The transparent display case as recited in claim 20, wherein when the transparent internal structure is located inside of the transparent external structure, a substantially cuboid structure is formed, excluding the first configuration of protrusions and the second configuration of protrusions.

23. A transparent display case system comprising:
a plurality of transparent three-dimensional structures each of the plurality of transparent three-dimensional structures comprising:
  a transparent internal structure comprising:
a plurality of walls forming an accommodation opening,
a magnetic element configured to be affixed or located within one of the plurality of walls; and
  a transparent external structure configured to receive the transparent internal structure and comprising:
    a set of two surfaces having a first configuration of protrusions, wherein the set of two surfaces are adjoining;
    another set of two surfaces having a second configuration of protrusions, wherein the set of two surfaces and the another set of two surfaces form at least one opening configured to allow insertion and removal of the transparent internal structure;
  wherein the set of two surfaces and the another set of two surfaces are configured for mating engagement with another transparent external structure having a set of two surfaces and another set of two surfaces that have substantially the same configurations, where the first configuration and the second configuration are configured to couple to each other;
a plurality of toys, each configured to be removably installed within the transparent internal structures and be magnetically coupled to the magnetic elements.

24. A display case comprising:
an internal structure comprising:
  a plurality of walls forming an accommodation opening,
  a magnetic element configured to be affixed or located within one of the plurality of walls; and
an external structure configured to receive the internal structure and comprising:
  a set of two surfaces having a first configuration of protrusions, wherein the set of two surfaces are adjoining;
  another set of two surfaces having a second configuration of protrusions, wherein the set of two surfaces and the another set of two surfaces form at least one opening configured to allow insertion and removal of the internal structure;
wherein the set of two surfaces and the another set of two surfaces are configured for mating engagement with another external structure having a set of two surfaces and another set of two surfaces that have substantially the same configurations, where the first configuration and the second configuration are configured to couple to each other,
wherein the internal structure is at least partially transparent, and the external structure is at least partially transparent,
wherein when the internal structure is located inside of the external structure, the accommodation opening is not accessible and a substantially cuboid structure is formed, excluding the first configuration of protrusions and the second configuration of protrusions.

* * * * *